(12) United States Patent
Ong

(10) Patent No.: US 7,278,581 B2
(45) Date of Patent: Oct. 9, 2007

(54) ELECTRONIC CREDIT CARD-ECC

(76) Inventor: Yong Kin Ong, 5 Sellenger Court, City Beach WA 6015 (AU)

( * ) Notice: Subject to any disclaimer, the term of this patent is extended or adjusted under 35 U.S.C. 154(b) by 0 days.

(21) Appl. No.: 10/203,870

(22) PCT Filed: Feb. 16, 2001

(86) PCT No.: PCT/AU01/00170

§ 371 (c)(1),
(2), (4) Date: Oct. 15, 2002

(87) PCT Pub. No.: WO01/61640

PCT Pub. Date: Aug. 23, 2001

(65) Prior Publication Data

US 2003/0075610 A1 Apr. 24, 2003

(30) Foreign Application Priority Data

Feb. 16, 2000 (AU) .............................. PQ 5644

(51) Int. Cl.
*G06K 19/06* (2006.01)

(52) U.S. Cl. .................. 235/492; 235/380; 340/5.4
(58) Field of Classification Search ................ 235/379, 235/380, 487, 492; 902/25, 26; 705/39, 41, 705/64; 340/5.4, 5.41, 5.42; 382/117, 124
See application file for complete search history.

(56) References Cited

U.S. PATENT DOCUMENTS

| | | | | | |
|---|---|---|---|---|---|
| 4,453,074 | A | * | 6/1984 | Weinstein | 235/380 |
| 4,614,861 | A | * | 9/1986 | Pavlov et al. | 235/380 |
| 4,697,072 | A | * | 9/1987 | Kawana | 235/380 |
| 4,701,601 | A | * | 10/1987 | Francini et al. | 235/492 |
| 4,755,940 | A | | 7/1988 | Brachtl et al. | 364/408 |

(Continued)

FOREIGN PATENT DOCUMENTS

| | | |
|---|---|---|
| DE | 19755568 | 6/1999 |
| EP | 0793186 A | 9/1997 |
| EP | 805424 A | 11/1997 |
| GB | 2204971 A | 11/1988 |
| GB | 2338381 | 12/1999 |
| GB | 2310069 | 8/2000 |
| GB | 2346239 | 8/2000 |
| JP | 60-209871 A * | 10/1985 |
| JP | 9044619 | 2/1997 |
| JP | 11167553 | 6/1999 |
| RU | 2060540 | 5/1996 |
| WO | WO 97/04609 | 2/1997 |
| WO | WO 97/15032 | 4/1997 |
| WO | WO 98/09227 | 5/1998 |
| WO | WO 99/31621 | 6/1999 |
| WO | WO 00/45247 | 8/2000 |
| WO | WO 00/46710 | 8/2000 |

*Primary Examiner*—Jared J. Fureman
(74) *Attorney, Agent, or Firm*—Needle & Rosenberg, P.C.

(57) ABSTRACT

Electronic Credit Card (ECC) is an electronic device that enables transmission/reception of data and/or digital information to/from a host computer via a Terminal Station (TS). TS includes Teller Machines in supermarkets/shopping complex, Automatic Teller Machines (ATM), EFTPOS devices and proprietary transceiver devices developed by Creative On-Line Technologies Limited for PC interface. It provides latest financial information including balances on its display unit. Keypads (1) enable PIN (personal identification number) entries so that an ECC is operational. Information Display Unit (2) including an LCD (liquid crystal display) screen or other display screens provides visual information. ENTER key (3) confirms a transaction. It is also used to activate an ECC when a PIN is keyed. Audio Transducer (4) confirms entries made on keypads (1). Audio Transducer is also used to activate a financial transaction via a telephone. Data transmission/reception is via Infra red (5), Magnetic (6) and Radio Frequency (7) devices.

27 Claims, 6 Drawing Sheets

U.S. PATENT DOCUMENTS

| | | | | |
|---|---|---|---|---|
| 4,766,293 A | * | 8/1988 | Boston | 235/379 |
| 5,097,115 A | * | 3/1992 | Ogasawara et al. | 235/380 |
| 5,130,519 A | * | 7/1992 | Bush et al. | 235/380 |
| 5,180,902 A | * | 1/1993 | Schick et al. | 235/380 |
| 5,225,667 A | | 7/1993 | Furuta et al. | 235/492 |
| 5,428,684 A | | 6/1995 | Akiyama et al. | |
| 5,539,825 A | | 7/1996 | Akiyama et al. | 380/24 |
| 5,590,038 A | * | 12/1996 | Pitroda | 705/41 |
| 5,623,552 A | * | 4/1997 | Lane | 382/124 |
| 5,737,423 A | * | 4/1998 | Manduley | 705/67 |
| 5,884,271 A | | 3/1999 | Pitroda | 705/1 |
| 5,907,142 A | * | 5/1999 | Kelsey | 235/380 |
| 5,955,961 A | * | 9/1999 | Wallerstein | 340/5.4 |
| 6,032,857 A | | 3/2000 | Kitagawa et al. | 235/379 |
| 6,098,055 A | | 8/2000 | Watanabe | 705/73 |
| 6,142,369 A | * | 11/2000 | Jonstromer | 235/380 |
| 6,188,309 B1 | * | 2/2001 | Levine | 340/5.4 |
| 6,257,486 B1 | * | 7/2001 | Teicher et al. | 235/380 |
| 6,510,983 B2 | * | 1/2003 | Horowitz et al. | 235/380 |
| 6,607,127 B2 | * | 8/2003 | Wong | 235/492 |
| 2001/0034717 A1 | * | 10/2001 | Whitworth | 705/64 |

* cited by examiner

Figure 1: A drawing of ECC physical form covering SAC with PIN control using a combination of infra-red, radio frequency and magnetic induction telecommunication devices. Drawing is not to scale.
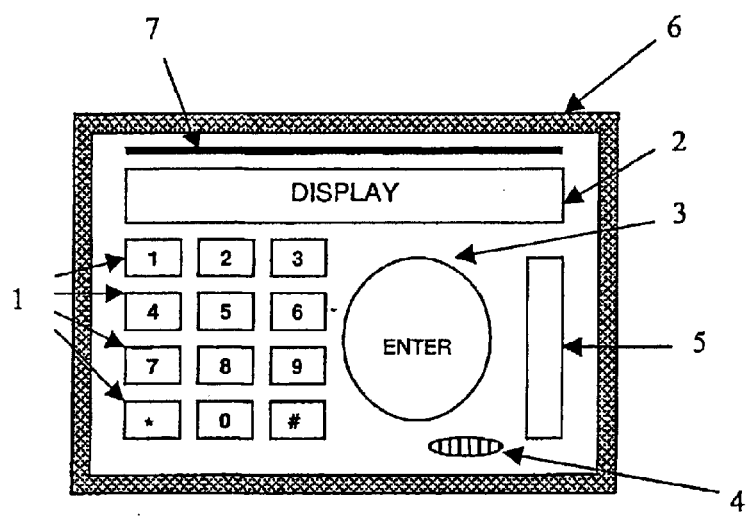

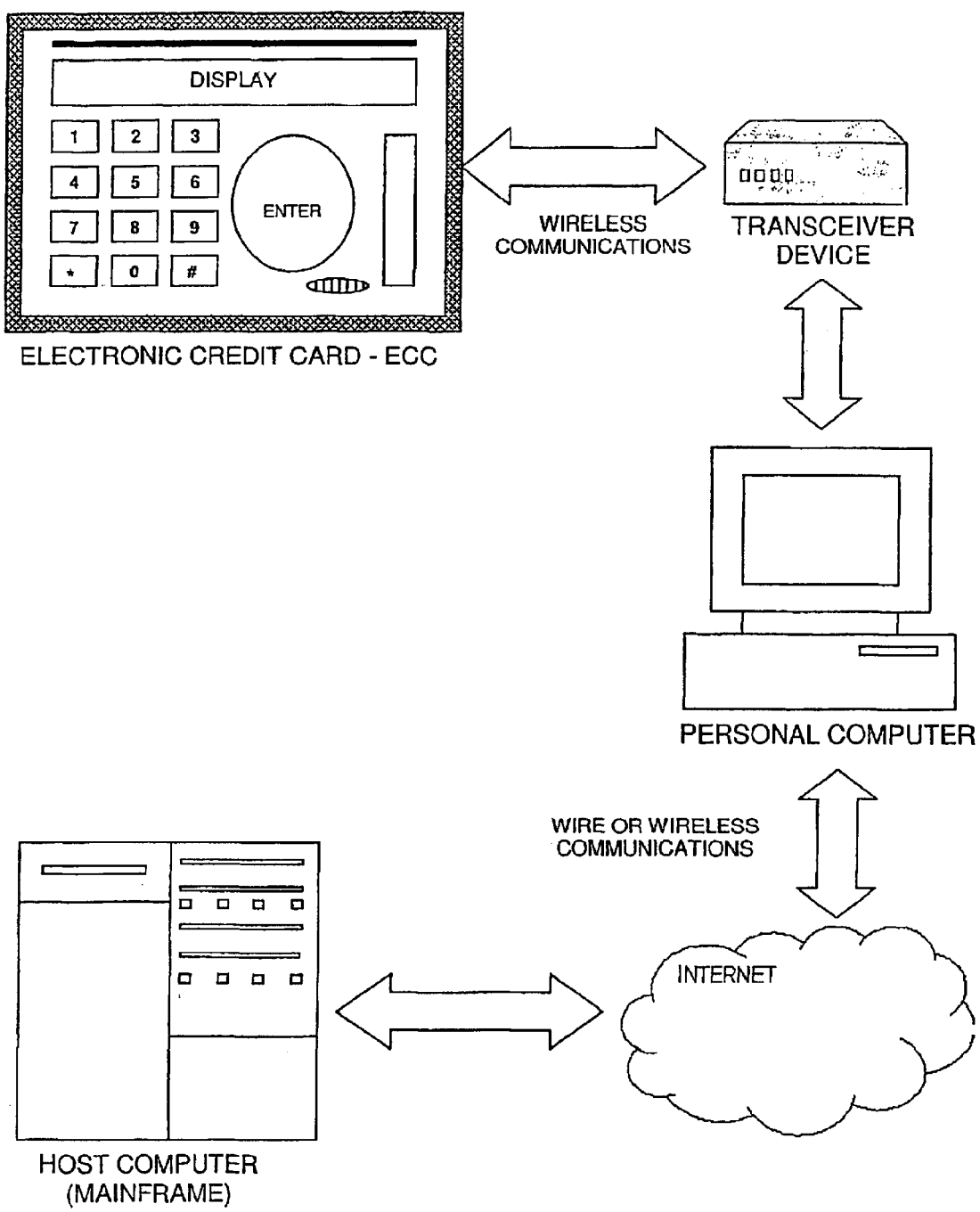
Figure 2: A drawing of ECC communications link to PC and Mainframe Computer. Drawing is not to scale.

Figure 3: A drawing of ECC communications link to Teller Machines, ATMs, EFTPOS and Host Computer. Drawing is not to scale.
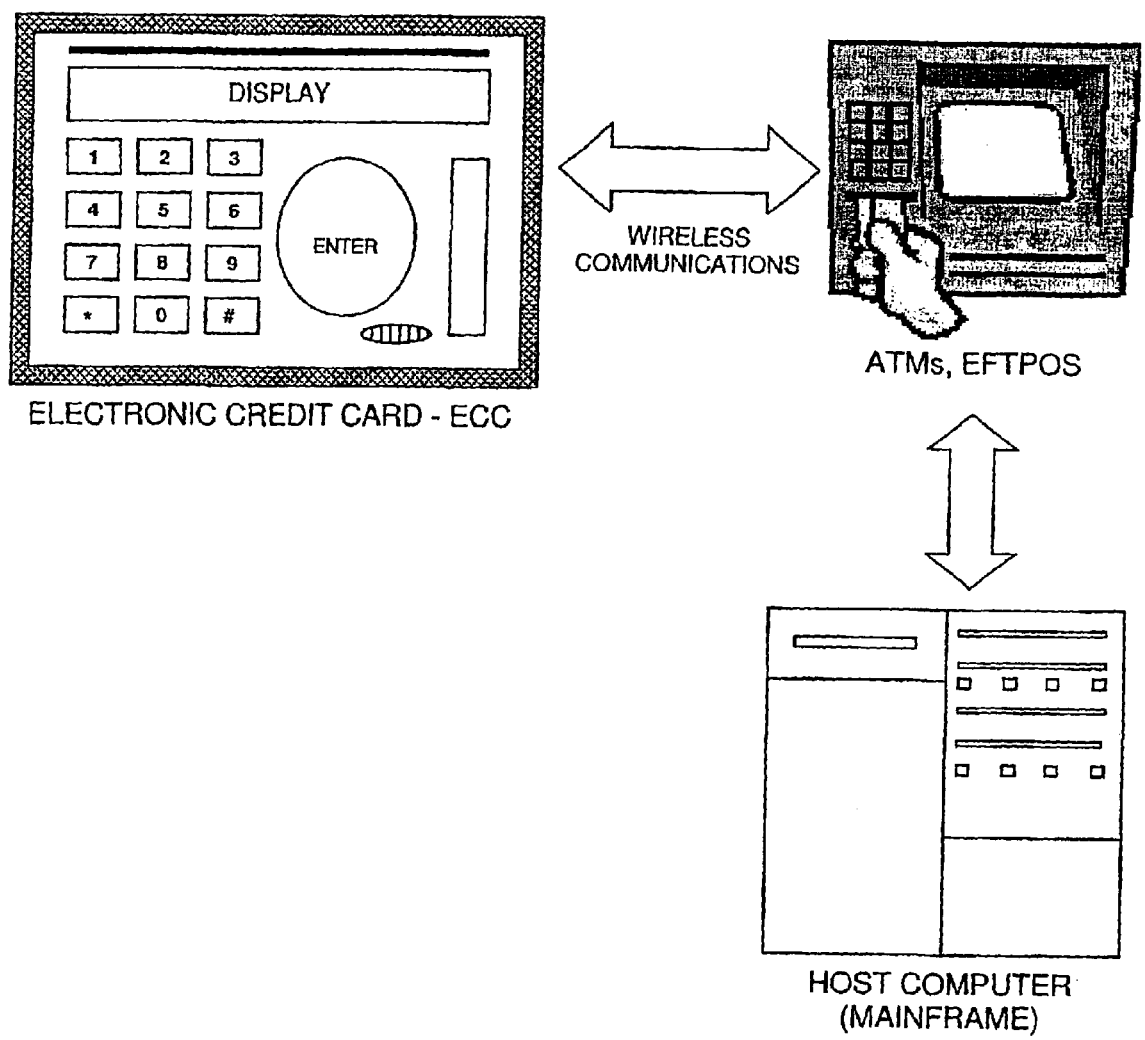

A view of ECC physical form is shown at Figure 4 to 12:

Figure 4: A drawing of ECC physical form covering SAC with PIN control using infrared telecommunication device. Drawing is not to scale.

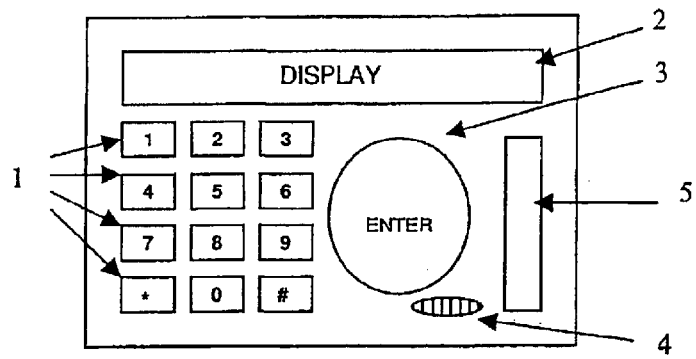

Figure 5: A drawing of ECC physical form covering SAC with PIN control using radio frequency telecommunication device. Drawing is not to scale

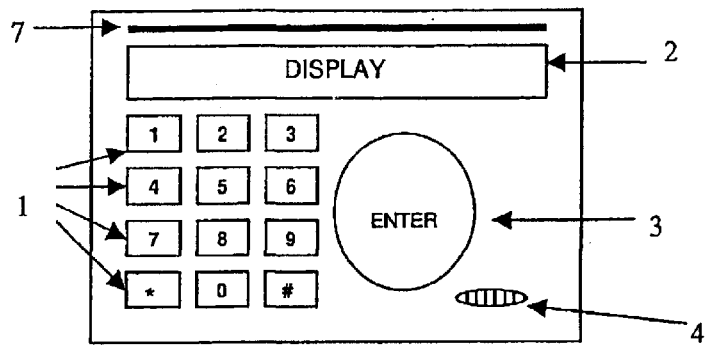

Figure 6: A drawing of ECC physical form covering SAC with PIN control using magnetic induction telecommunication device. Drawing is not to scale.

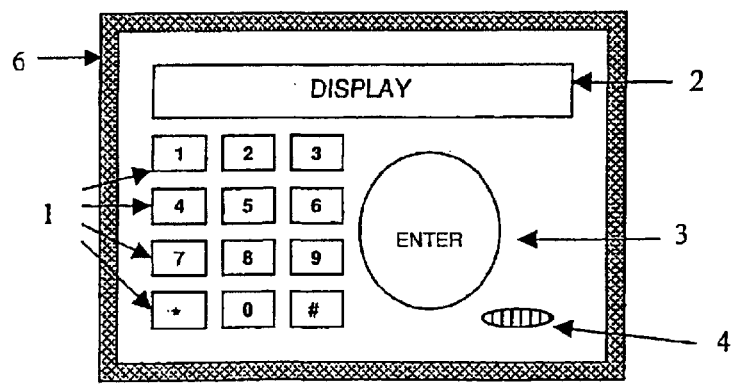

Figure 7: A drawing of ECC physical form covering SAC with PIN control using wire contact telecommunication device. Drawing is not to scale.

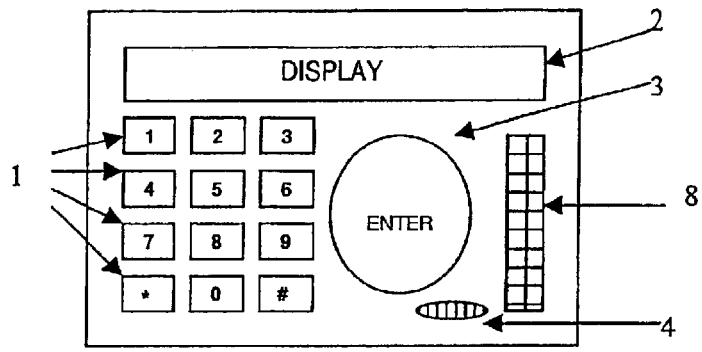

Figure 8: A front view drawing of ECC physical form covering SAC with PIN control using magnetic strip telecommunication device. Drawing is not to scale.

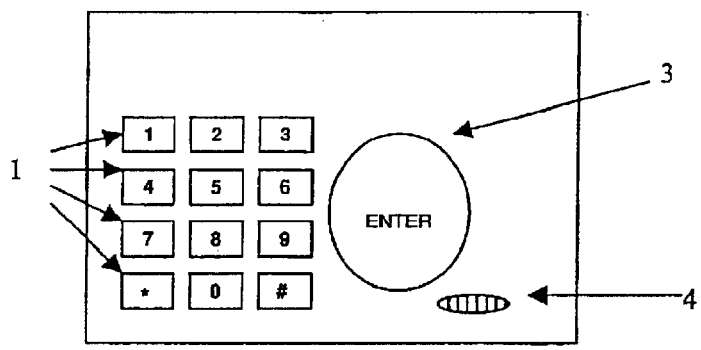

Figure 9: A rear front view drawing of ECC physical form covering SAC with PIN control using magnetic strip telecommunication device. Drawing is not to scale.

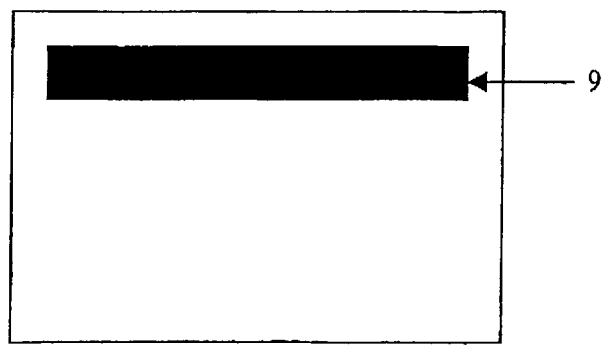

Figure 10: A drawing of ECC physical form covering SAC with PIN control using a combination of infra-red, radio frequency and magnetic induction telecommunication devices. Drawing is not to scale.

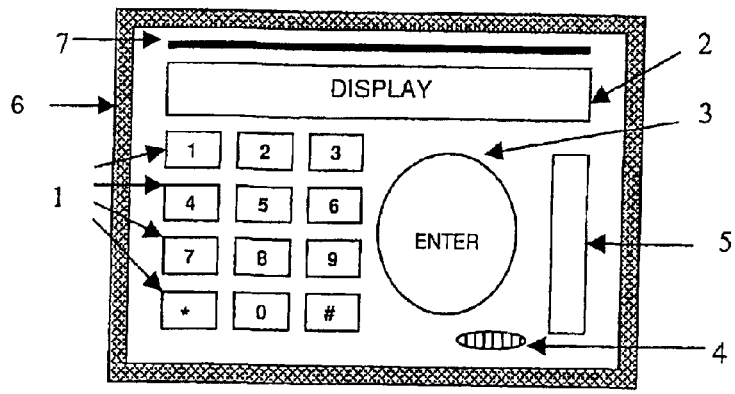

Figure 11: A drawing of ECC physical form covering SAC with finger print scanner pad with a combination of infra-red, radio frequency and magnetic induction telecommunication devices. Drawing is not to scale.

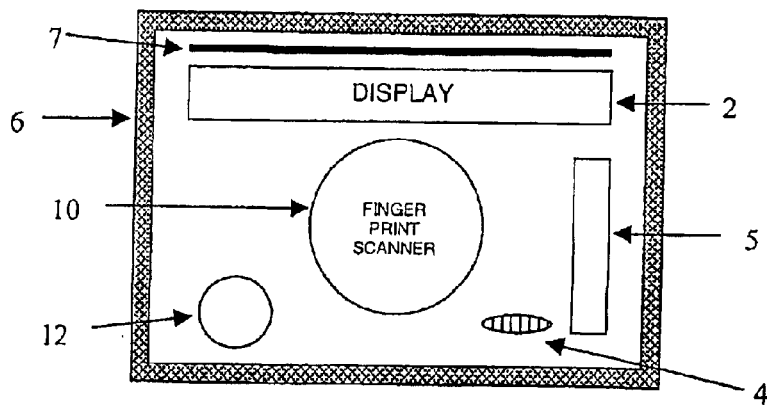

Figure 12: A drawing of ECC physical form covering SAC with eyeball retina scanner pad with a combination of infra-red, radio frequency and magnetic induction telecommunication devices. Drawing is not to scale.

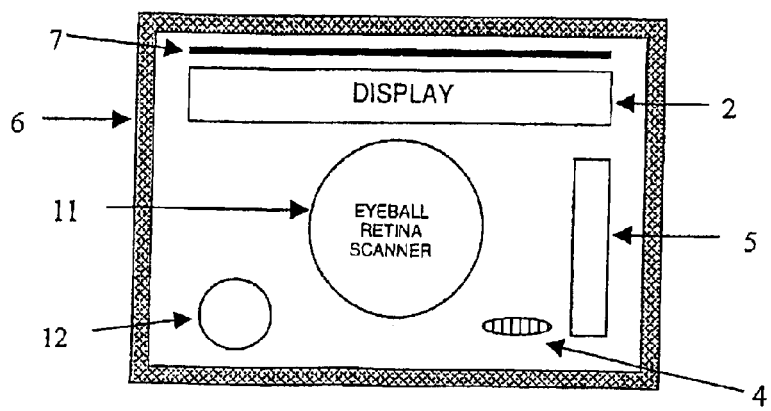

ELECTRONIC CREDIT CARD-ECC

The present application is a 35 U.S.C. §371 national phase application from, and claims priority to, international application PCT/AU01/00170, filed Feb. 16, 2001 (published under PCT Article 21(2) in English), which claims priority to Australian patent application Serial No. PQ5644, filed Feb. 16, 2000, which applications are incorporated herein in their entirety by reference.

FIELD OF THE INVENTION

The present invention relates to an electronic credit card providing secure controlled and reliable transaction of funds.

BACKGROUND OF THE INVENTION

The present credit card environment and systems have the following shortfalls:

- When a credit card is reported lost or stolen by a holder he or she has to contact the company or organisation that issued the card to cancel the card in order to prevent illegal transactions. Cancellation may not occur immediately if the holder is unaware that his or her card is missing.
- The present security measures undertaken by credit card companies and/or organisations through the use of "smart card" technology are inadequate to prevent fraud. Similarly the use of holographic images on credit cards does not eliminate fraud either.
- Use of a signature as a validation control may be overlooked and can be forged.
- The technology behind current credit cards is outdated and not suitable for a secure transaction via the Internet.
- It does not prevent hackers who penetrate "secure websites" to make use of credit card details for fraud.
- Giving a merchant credit card details is like giving him or her a "signed blank cheque". Credit companies or organisations are not efficient when dealing with insincere merchants.
- The customer must rely on trusting the merchant not to misuse the credit card details.

The present invention seeks to provide an electronic credit card that attempts to overcome the shortfalls of the present credit card system.

SUMMARY OF THE PRESENT INVENTION

In accordance with the present invention there is provided an electronic credit card comprising at least:
- a user of verification means for verifying the identity of a user;
- a means for generating a unique authorisation code when the user's identity is verified;
- a storage means for storing the user's account details for use in an electronic funds transfer transaction; and
- a communication means for communicating with a transaction station to provide the transaction station with account details of the user and the authorisation code to facilitate an electronic fund transfer transaction.

Preferably the electronic credit card includes a timer means for determining a period of time after which the verification of the user's identity ends.

Preferably the electronic credit card includes a disablement means for disabling use of the electronic credit card if a predetermined number of attempts verify the identity of the user fail. Preferably the disablement means is activatable remotely by an issuer of the electronic credit card or other authority.

Preferably, in one embodiment, the unique authorisation code is generated in synchronisation with the transaction station.

Preferably the storage means is arranged to store a financial limit for transactions that the electronic credit card may be used for. Preferably the financial limit is provided to the transaction station by the communication means. Alternatively the electronic credit card including a processor means for keeping track of the use of the electronic credit card and will not generate or provide the authorisation code if the financial limit is exceeded. Alternatively the financial limit may be retrieved via the transaction station from a financial institution.

Preferably the storage means is arranged to store more than one set of account details.

Preferably the storage means is arranged to store electronic cash and the communication means is arranged to facilitate the use of the electronic cash stored in the storage means if the user identification is verified.

In one embodiment the user identification means includes a keypad for entry of a personal identification number (PIN) and PIN verification means to authenticate the identity of the user. In another embodiment the user identification means includes a fingerprint reader for reading a fingerprint of the user and a fingerprint verifying means for verifying the identity of the user from the user's fingerprint. In yet another embodiment the user identification means includes a retina scanner for scanning a retina pattern and a retina pattern verifying means for verifying the identity of the user from the scanned retina pattern.

In one embodiment the communication means includes an infra red transfer means. In another embodiment the communication means includes a radio frequency transfer means. In yet another embodiment the communication means includes a magnetic induction transfer means. In yet a further embodiment the communication means includes a wire contact transfer means.

Preferably the storage means and communication means are partly in the form of a magnetic strip for storing account details and communication of the account details to the transaction station.

Preferably the communication means includes a telephone network interface.

Preferably the storage means stores transaction details and a processor means is provided to calculate the funds available.

Preferably the electronic credit card is incorporated into another device.

DETAILED DESCRIPTION OF THE INVENTION

In order to provide a better understanding, preferred embodiments will now be described in detail, by way of example only, with reference to the accompanying drawings, in which:

FIG. 1 is a schematic representation of an electronic credit card in accordance with the present invention;

FIG. 2 is a schematic representation of communication between an electronic credit card of FIG. 1 with a personal computer and thus and in turn via computer network with a host computer;

FIG. 3 is a schematic representation between electronic credit card of FIG. 1 and an ATM or EFTPOS terminal and a host computer;

FIG. 4 is an alternative embodiment of an electronic credit card in accordance with the present invention;

FIG. 5 is a further alternative embodiment of an electronic credit card in accordance with the present invention;

FIG. 6 is a further alternative embodiment of an electronic credit card in accordance with the present invention;

FIG. 7 is a further alternative embodiment of an electronic credit card in accordance with the present invention;

FIG. 8 is a further alternative embodiment of an electronic credit card in accordance with the present invention;

FIG. 9 is a rear view of an electronic credit card in accordance with the present invention having a magnetic strip communication device;

FIG. 10 is a further alternative embodiment of an electronic credit card in accordance with the present invention;

FIG. 11 is a further alternative embodiment of an electronic credit card in accordance with the present invention; and FIG. 12 is a further alternative embodiment of an electronic credit card in accordance with the present invention;

Referring to FIG. 1, there is shown an electronic credit card including a user verification means; a means for generating a unique code (not shown); a storage means for storing the user's account details (not shown); and a communication means. In this embodiment the user verification means includes a keypad for entry of a personal identification number (PIN) and the communication means includes a infra red communication device 5, a magnetic induction telecommunication device 6, radio frequency telecommunication device in the form of an antenna 7. The electronic credit card also includes a display 2, an enter/confirmation button and an audio transducer 4 for providing an audible sound.

The electronic code also includes a processor means for receiving input from the keypad 1 and the button 3. The processor means is also arranged to control output of the display 2 and output of the audio transducer 4. The processor means is further arranged to control communication via the communication means 5, 6, 7.

The keypad in combination with firmware control of the processor forms the user verification means. The processor under the control of firmware forms a means for generating the unique authorisation code. The infra red communication device, magnetic communication device, or radio frequency communication device under the control of firmware control of the processor forms the communication means. The firmware may be stored in the storage means and may be reprogrammed.

The electronic credit card operates by a user entering a PIN number into the keypad 1 whereby the user verification means verifies that the PIN number is correct and thus the identity of the user is verified. The means for generating unique authorisation code then generates the authorisation code which is provided along with the user's account details, to the communication means which communicates these to a transaction station to facilitate an electronic funds transfer transaction.

The transfer station must be configured to only continue with the electronic funds transfer transaction with the receipt of the unique authorisation code and account details.

Referring to FIG. 2, communication between the electronic credit card is shown with a transceiver device which talks with a personal computer. The transceiver device and personal computer act, in this example as the transaction station. The transaction station may then communicate via wire or wireless communications to computer networks, such as the Internet to a host computer in order for conducting electronic funds transfer transaction.

Referring to FIG. 3, the electronic credit card communicates by it's communication means with an automatic teller machine (ATM) or an electronic funds transfer point of sale (EFTPOS) machine, which in turn communicates via standard methods to a host computer to perform electronic funds transfer, cash withdrawal or other transaction.

FIG. 4 shows a typical physical form of an electronic credit card with a keypad as the user verification means, and infra red receiver as part of the communication means.

FIG. 5 shows a version of the electronic credit cards with a keypad forming part of the user verification means and radio frequency antenna forming part of the communication means.

FIG. 6 shows a version of the electronic credit card with a keypad forming part of the user verification means and magnetic induction communication device 6 forming part of the communication means.

FIG. 7 shows a version of the electronic credit card with a keypad forming part of the user verification means and a wire contact communication device 8 forming part of the communication means.

FIG. 8 shows a version of the electronic credit card with a keypad acting as part of the user verification means and a magnetic strip 9 shown in FIG. 9 providing coded information as part of the communication means.

FIG. 10 shows a version of the electronic credit card with a keypad 1 forming part of the user verification means, a combination of infra red transmitter receiver 5, radio frequency antenna 7 and induction 6 forming part of the communication means.

Referring to FIG. 11, a version of the electronic credit card with a fingerprint scanner 10 forming part of the user verification means and an infra red transmitter receiver 5, radio frequency antenna 7 and indication means 6 forming part of the communication means.

Referring to FIG. 12, an embodiment of the electronic credit card including an eyeball retina scanner pad 11 which forms part of the user verification means and an infra red transmitter 5, radio frequency antenna 7 and a magnetic induction means 6 form part of the communication means.

Use of the electronic credit card will prevent merchants from using an unauthorised transaction as each transaction can only be generated by a unique transaction provided by the electronic credit card. A merchant cannot generate a unique transaction identifier without an electronic credit card. The electronic credit card verifies the identity of the user before it is activated. The electronic credit card will be disabled if a predetermined number of attempts to gain access to its operation fail and this will prevent fraud in the event that an electronic credit card is stolen. An authorising distributor or other authorised body could re-initialise the electronic credit card through a controlled management system used to issue the electronic credit card.

The electronic credit card can be disabled at a transaction station through a system control function by the issuing company or organisation. This will enable immediate termination of electronic credit card if required. Electronic credit card may download information to a computer system via one of its telecommunication modes. This will ensure data integrity at a time when power source replacement or re-charging. Furthermore it will also facilitate transactional history download.

The electronic credit card may generate its transaction number either in synchronisation with the transfer station link to a remote site system control function. The transaction station may be an Internet site with this capability.

The electronic credit card financial limit can be verified by the transaction station with a link to a remote site system. This will prevent the electronic credit card from generating further transactions once the financial limit is reached. The funds limiting function is optional and may be activated by either the financial institution issuing the electronic credit card or by the holder to cross-check and either alert him or her of his or her account balance. The electronic credit card may transact electronic cash which can be used as a currency exchange device. A traveller going abroad can choose to have a set amount for a specific currency of a particular country that he or she is visiting. The electronic credit card may be incorporated into another electronic device or piece of equipment, for example it may have been incorporated in a mobile phone.

An audio transducer is used to confirm a successful process of successful verification of the user may also be used to provide communication over a telephone network.

A self-contained timer deactivates the user verification after a predetermined lapsed amount of time. This feature eliminates a stolen electronic credit card from being used when the user identification has already been verified.

The electronic credit card keypads may be made from reflectable board membrane, rubber and/or plastics material to provide durability and in a slim size. The keypad may be designed with round, square or other shaped buttons.

The electronic credit card can store more than one credit card/debit card accounts. These can be cards distributed from different financial institutions, organisations or companies. The electronic credit card can retain amounts of transactions conducted by the user, with information regarding his or her financial balance in relation to the account limit. This may be available for one or more credit card accounts.

Modifications and variations may be made to the present invention without departing from the basic inventive concepts. The nature of such modifications and variations are to be determined within the scope of the present invention as defined by the foregoing description and appended claims.

The claims defining the invention are as follows:

1. An electronic credit card comprising:
   a user verifier for verifying a user's identity; a code generator for generating a unique authorization code when the user's identity is verified;
   a storage for storing the user's account details for use in an electronic funds transfer transaction; and
   a communicator for securely communicating the account details of the user and the authorization code to a transaction station to facilitate an electronic fund transfer transaction.

2. An electronic credit card in accordance with claim 1, wherein the code generator generates the unique authorization code in synchronization with the transaction station by use of synchronization signal transmitted between the transaction station and the code generator.

3. An electronic credit card in accordance with claim 1, wherein the electronic credit card further comprises a disabler for disabling use of the electronic credit card under certain conditions.

4. An electronic credit card in accordance with claim 3, wherein the disabler operates when activated remotely by an issuer of the electronic credit card or other authority.

5. An electronic credit card in accordance with claim 3, wherein the disabler operates when a predetermined number of attempts verify the identity of the user fail.

6. An electronic credit card in accordance with claim 1, wherein the storage is arranged to store a financial limit wherein transactions over the financial limit are disallowed.

7. An electronic credit card in accordance with claim 6, wherein the communicator is configured to provide the financial limit to the transaction station.

8. An electronic credit card in accordance with claim 6, wherein the financial limit may be retrieved via the transaction station from a financial institution for storage in the storage.

9. An electronic credit card in accordance with claim 8, wherein the processor is configured to disallow generation of the authorization code or to disallow communication of the authorization code if the financial limit is exceeded.

10. An electronic credit card in accordance with 6, wherein the storage stores transaction details and a processor calculates funds available in the electronic fund transfer transaction from the financial limit.

11. An electronic credit card in accordance with claim 1, wherein the electronic credit card includes a processor for tracking of the use of the electronic credit card.

12. An electronic credit card in accordance with claim 1, wherein the storage is arranged to store more than one set of account details.

13. An electronic credit card in accordance with claim 1, wherein the storage is arranged to store electronic cash and the communicator is arranged to facilitate the use of the electronic cash when the user identification is verified.

14. An electronic credit card in accordance with claim 1, wherein the user verifier comprises a keypad for a personal identification number (PIN) entry and PIN verification means to authenticate the identity of the user.

15. An electronic credit card in accordance with claim 1, wherein the user verifier comprises a fingerprint reader for reading a fingerprint and a fingerprint verifying means for verifying the identity of the user.

16. An electronic credit card in accordance with claim 1, wherein the user verifier comprises a retina scanner for scanning a retina pattern and a retina pattern verifying means for verifying the identity of the user.

17. An electronic credit card in accordance with claim 1, wherein the communicator comprises an infrared transfer means.

18. An electronic credit card in accordance with claim 1, wherein the communicator comprises a radio frequency transfer means.

19. An electronic credit card in accordance with claim 1, wherein the communicator comprises a magnetic induction transfer means.

20. An electronic credit card in accordance with claim 1, wherein the communicator comprises a wire contact transfer means.

21. An electronic credit card in accordance with claim 1, wherein the storage and communicator are partly in the form of a magnetic strip for storing the account details and communication of the account details to the transaction station.

22. An electronic credit card in accordance with claim 1, wherein the communicator comprises a telephone network interface.

23. An electronic credit card in accordance with claim 1, wherein the electronic credit card is incorporated into another device.

24. An electronic credit card comprising:

a user verifier for verifying a user's identity;

a code generator for generating a unique authorization code when the user's identity is verified;

a storage for storing the user's account details for use in an electronic funds transfer transaction;

a communicator for securely communicating the account details of the user and the authorization code to a transaction station for facilitation of an electronic fund transfer transaction; and wherein the code generator generates the unique authorization code in synchronization with the transaction station.

25. An electronic fund transfer system comprising:

a transaction station; and an electronic credit card comprising: a user verifier for verifying an identity of a user, the unique authorization code acting as proof of identity and as a unique transaction identifier; a code generator for generating an unique authorization code when the user's identity is verified; a storage for storing the user's account details for use in an electronic funds transfer transaction; and a communicator for securely communicating the account details of the user and the authorization code to a transaction station for facilitation of an electronic fund transfer transaction;

wherein the transaction station is configured to conduct the electronic funds transfer after it receives the unique authorization code facilitate acting as proof of identity of the user, wherein the transaction station conducts the electronic fund transfer transaction according to the account details provided and uses the unique transaction identifier as or in an unique identifier of the transaction; and wherein the code generator generates the unique authorization code in synchronization with the transaction station.

26. An electronic credit card comprising:

a user verification means for verifying a user's identity;

a means for generating a unique authorization code when the user's identity is verified;

a storage means for storing the user's account details for use in an electronic funds transfer transaction; and a communication means for securely communicating the account details of the user and the authorization code to a transaction station for facilitation of an electronic fund transfer transaction;

wherein the code generator generates the unique authorization code in synchronization with the transaction station.

27. A method of performing an electronic fund transfer transaction comprising:

providing an electronic credit card comprising a user verifier for verifying the identity of a user, a timer for ending the verification of the user's identity after a period of time, a code generator that generates a unique authorization code in synchronization with a transaction station when the user's identity ia verified, a communication means for communicating with the transaction station, and a storage means that stores the users account identification details for use of an electronic fund to transfer transaction;

verifying the identity of the user;

generating a unique authorization code when the user's identity is verified;

securely communicating the unique authorization code and the user's account identification details to a transaction station; and using the user's account identification details to conduct an electronic fund transfer transaction as authorized by the unique authorization code.

* * * * *

UNITED STATES PATENT AND TRADEMARK OFFICE
CERTIFICATE OF CORRECTION

PATENT NO. : 7,278,581 B2
APPLICATION NO. : 10/203870
DATED : October 9, 2007
INVENTOR(S) : Yong Kin Ong It is certified that error appears in the above-identified patent and that said Letters Patent is hereby corrected as shown below:

Column 5, line 46, cancel the text beginning with "1. An electronic credit card" to and ending with "fund transfer transaction." in Column 5, line 55, and insert the following claim:

--1. An electronic credit card comprising:
  a user verifier for verifying a user's identity:
  a timer for ending the verification of the user's identity after a period of time;
  a code generator for generating a unique authorization code when the user's identity is verified, wherein the code generator generates the unique authorization code in synchronization with a transaction station;
  a storage for storing the user's account details for use in an electronic funds transfer transaction; and
  a communicator for securely communicating the account details of the user and the authorization code to a transaction station to facilitate an electronic fund transfer transaction.--.

Column 7, line 15, cancel the text beginning with "An electronic credit card" to and ending with "the transaction station." in Column 7, line 39, and insert the following claim:

--25. An electronic fund transfer system comprising:
  a transaction station; and
  an electronic credit card comprising: a user verifier for verifying an identity of a user, a code generator for generating an unique authorization code when the user's identity is verified; the unique authorization code acting as a proof of identity and as a unique transaction identifier; a storage for storing the user's account details for use in an electronic funds transfer transaction; and a communicator for securely communicating the account details of the user and the authorization code to the transaction station for facilitation of an electronic funds transfer transaction;

UNITED STATES PATENT AND TRADEMARK OFFICE
CERTIFICATE OF CORRECTION

PATENT NO. : 7,278,581 B2
APPLICATION NO. : 10/203870
DATED : October 9, 2007
INVENTOR(S) : Yong Kin Ong It is certified that error appears in the above-identified patent and that said Letters Patent is hereby corrected as shown below:

wherein the transaction station is configured to conduct the electronic funds transfer according to the account details after it receives the unique authorization code;
      wherein the transaction station uses the unique transaction identifier as or in an unique identifier of the identifier of the transaction; and
      wherein the code generator generates the unique authorization code in synchronization with the transaction station.--.

Signed and Sealed this

Twenty-seventh Day of January, 2009

JOHN DOLL
*Acting Director of the United States Patent and Trademark Office*